(12) United States Patent
Le

(10) Patent No.: US 6,881,140 B2
(45) Date of Patent: Apr. 19, 2005

(54) APPARATUS FOR MIXING AIR IN A VEHICLE HVAC SYSTEM

(75) Inventor: Vu Le, Huntington Woods, MI (US)

(73) Assignee: TRW Automotive U.S. LLC, Farmington Hills, MI (US)

( * ) Notice: Subject to any disclaimer, the term of this patent is extended or adjusted under 35 U.S.C. 154(b) by 0 days.

(21) Appl. No.: 10/403,949

(22) Filed: Mar. 31, 2003

(65) Prior Publication Data

US 2004/0192185 A1 Sep. 30, 2004

(51) Int. Cl.⁷ ................................................ B60H 3/00
(52) U.S. Cl. ...................... 454/156; 454/160; 165/41; 165/42
(58) Field of Search ............................... 454/121, 156, 454/126; 165/41, 42; 237/12.3 B

(56) References Cited

U.S. PATENT DOCUMENTS

| 4,355,753 A | * 10/1982 | Watanabe | 237/12.3 A |
| 4,519,302 A | * 5/1985 | Nilsson et al. | 454/126 |
| 5,673,964 A | * 10/1997 | Roan et al. | 296/208 |
| 5,988,263 A | * 11/1999 | Schwarz | 165/41 |
| 6,032,723 A | * 3/2000 | Tsuihiji et al. | 165/42 |
| 6,048,263 A | 4/2000 | Uchida et al. | |
| 6,138,749 A | * 10/2000 | Kawai et al. | 165/204 |
| 6,209,404 B1 | 4/2001 | Le | |
| 6,450,877 B1 | * 9/2002 | Tsurushima et al. | 454/121 |
| 6,607,029 B1 | * 8/2003 | Danieau | 165/203 |
| 6,695,691 B1 | 2/2004 | Le | |

* cited by examiner

*Primary Examiner*—Derek S. Boles
(74) *Attorney, Agent, or Firm*—Tarolli, Sundheim, Covell & Tummino L.L.P.

(57) ABSTRACT

An apparatus (10) for an HVAC system that provides air at a controllable temperature into a passenger compartment of a vehicle comprises a housing (20) defining a chamber (70). The chamber (70) has a first inlet (50) through which cold air enters the chamber and a second inlet (76) through which warm air enters the chamber. The housing (20) further includes at least one outlet (56, 58, 130, 132) in fluid communication with the chamber (70) and for directing air into the passenger compartment in the vehicle. At least one airflow diverter (90, 100) is disposed in the chamber (70) for causing a portion of the cold air flowing through the first inlet (50) to mix in the chamber with the warm air flowing through the second inlet (76).

27 Claims, 7 Drawing Sheets

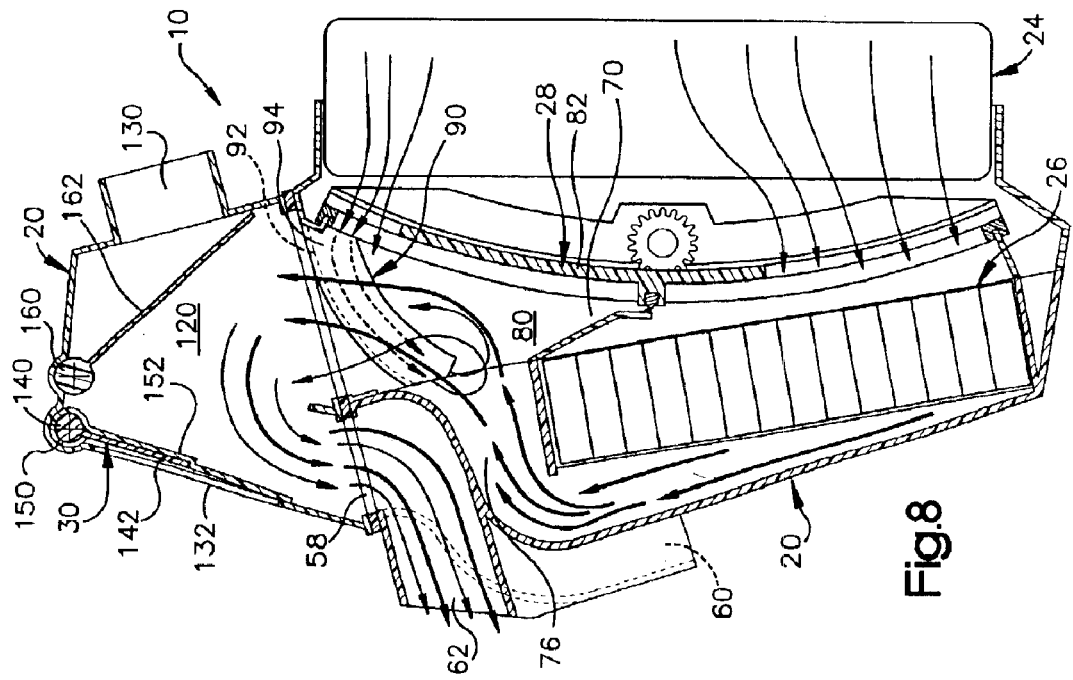
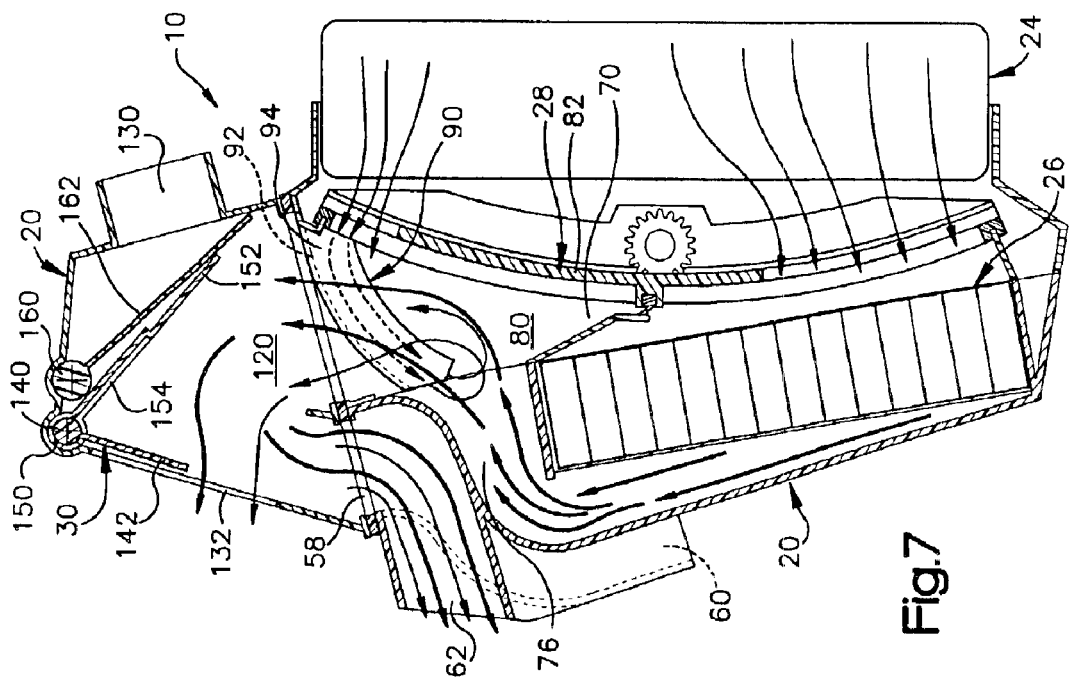

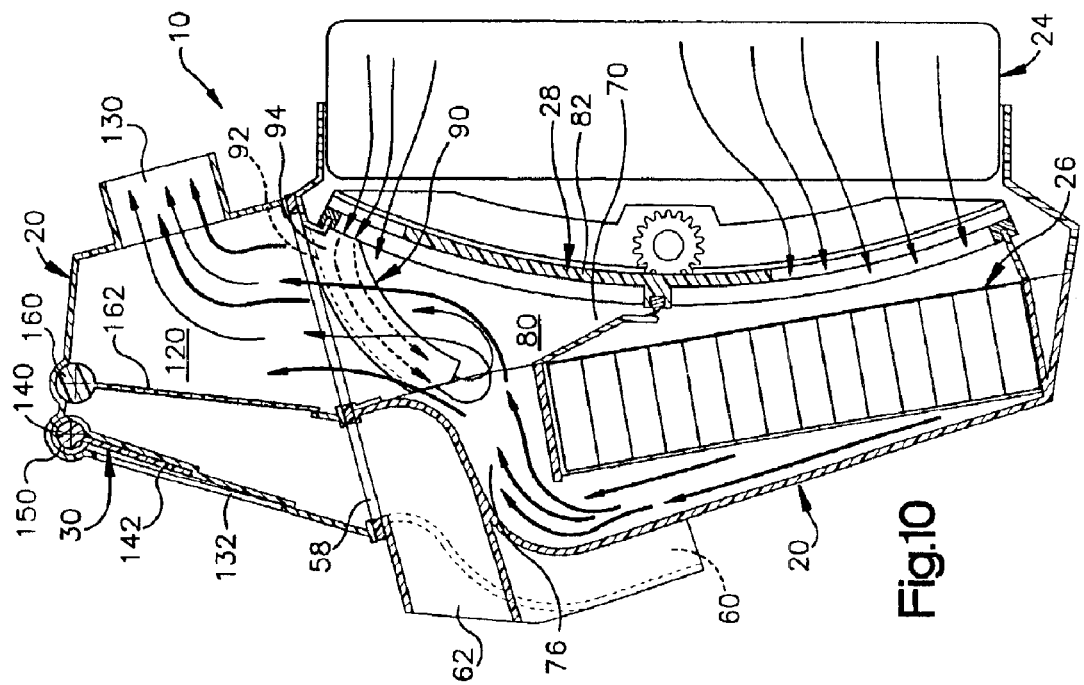
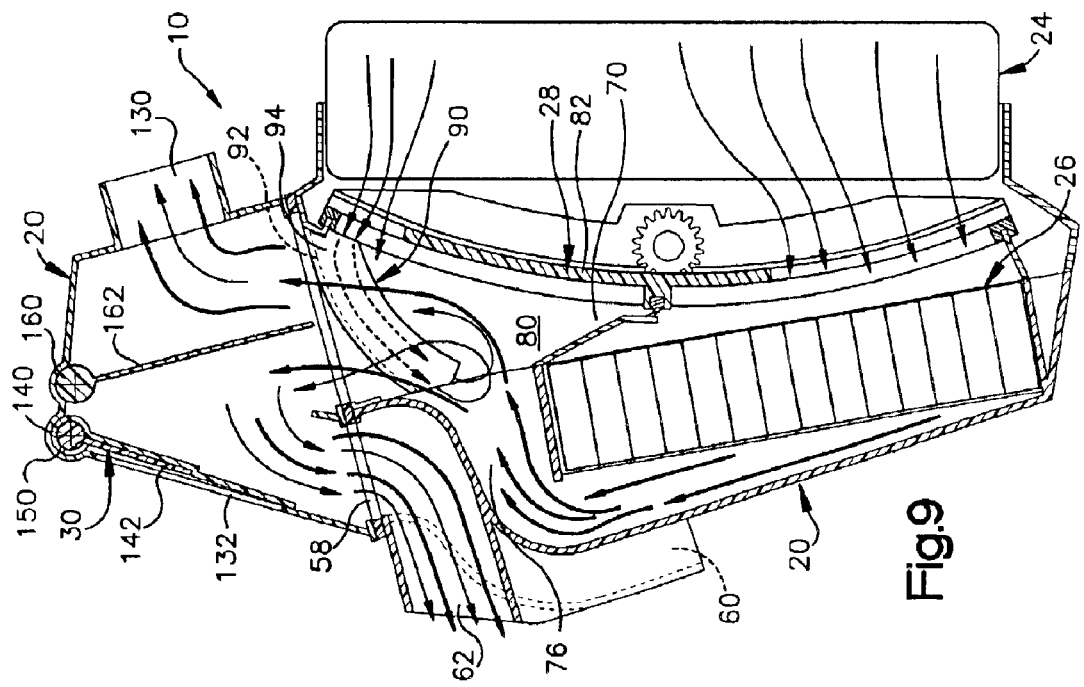

APPARATUS FOR MIXING AIR IN A VEHICLE HVAC SYSTEM

TECHNICAL FIELD

The present invention is directed to an apparatus for mixing air in a heating, ventilation, and air conditioning (HVAC) system in a vehicle.

In a typical vehicle heating, ventilation, and air conditioning system (HVAC) system, a heater core is mounted in an air duct downstream of an evaporator core. Hot engine coolant is circulated through the heater core to heat air directed through the heater core. For air conditioning, a refrigerant is circulated through the evaporator core to cool air directed through the evaporator core. Control of the air temperature is obtained by controlling the flow of air from the evaporator core into the heater core. For maximum cooling, all of the air flow from the evaporator core bypasses the heater core and travels through a chamber and into the passenger compartment. Alternatively, for maximum heating, all of the air flow from an inactive evaporator core passes through the heater core, where the air is heated, before traveling through the chamber and into the passenger compartment. Intermediate these two extremes, bypass (cold) air flow and air flow through the heater core are mixed in the chamber to provide air into the passenger compartment at intermediate temperatures.

Many of the components of the HVAC system, such as the heater core, the evaporator core, the ducting, and the chamber described above, are located in the vehicle instrumental panel. Physical space in the vehicle instrument panel has historically been limited, and is even more limited today as new electronic devices and convenience features are being added to the instrument panel. Consequently, the volume of space in the instrument panel that is taken up by the HVAC system must be minimized.

A challenge encountered when minimizing the size of the HVAC system in the instrument panel is to maintain a high overall air flow while keeping the air temperature stratification small. Stratification in the air temperature exiting the HVAC system can occur in relatively small-sized HVAC systems because the flow of cold air does not adequately mix in the chamber with the flow of hot air. Such stratification is undesirable as it can result in cold air exiting from one outlet in the instrument panel while hot air exits from another outlet in the instrument panel.

SUMMARY OF THE INVENTION

The present invention is an apparatus for a heating, ventilation, and air conditioning system that provides air at a controllable temperature into a passenger compartment of a vehicle. The apparatus comprises a housing defining a chamber. The chamber has a first inlet through which cold air enters the chamber and a second inlet through which warm air enters the chamber. The housing further includes at least one outlet in fluid communication with the chamber and for directing air into the passenger compartment in the vehicle. The apparatus further comprises means for mixing, in the chamber, a portion of the cold air entering the chamber through the first inlet with the warm air entering the chamber through the second inlet. The means for mixing is disposed in the chamber.

In accordance with another aspect, the present invention is an apparatus for a heating, ventilation, and air conditioning system that provides air at a controllable temperature into a passenger compartment of a vehicle. The apparatus comprises a housing defining a chamber. The chamber has a first inlet through which cold air enters the chamber and a second inlet through which warm air enters the chamber. The housing further includes at least one outlet in fluid communication with the chamber and for directing air into the passenger compartment in the vehicle. At least one airflow diverter is disposed in the chamber for causing a portion of the cold air flowing through the first inlet to mix in the chamber with the warm air flowing through the second inlet.

In accordance with yet another aspect, the present invention is an apparatus for a heating, ventilation, and air conditioning system that provides air at a controllable temperature into a passenger compartment of a vehicle. The apparatus comprises a housing defining a chamber. The chamber has a first inlet through which cold air enters the chamber and a second inlet through which warm air enters the chamber. The housing further includes at least one outlet in fluid communication with the chamber and for directing air into the passenger compartment in the vehicle. At least one airflow diverter redirects the flow of a portion of the cold air entering the chamber through the first inlet to cause the portion of cold air to mix in the chamber with the warm air entering the chamber through the second inlet. The at least one airflow diverter extends from the housing in the chamber.

In accordance with still another aspect, the present invention is a heating, ventilation, and air conditioning (HVAC) apparatus for delivering air at a controlled temperature into the passenger compartment of a vehicle. The HVAC apparatus comprises a housing having a chamber. The housing defines first and second inlets for directing airflow into the chamber and at least one outlet for directing airflow from the chamber into the passenger compartment. An evaporator core is in fluid communication with the first inlet. The evaporator core produces a flow of cold air. A heater core is in fluid communication with the second inlet. The heater core produces a flow of warm air. At least one airflow diverter is disposed in the chamber. The at least one airflow diverter causes a portion of the cold air flowing through the first inlet to mix in the chamber with the warm air flowing through the second inlet.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 7 is a view similar to FIG. 6 illustrating parts of the apparatus in different positions;

FIG. 8 is a view similar to FIG. 6 illustrating parts of the apparatus in different positions;

FIG. 9 is a view similar to FIG. 6 illustrating parts of the apparatus in different positions; and FIG. 10 is a view similar to FIG. 6 illustrating parts of the apparatus in different positions.

DESCRIPTION OF EMBODIMENTS

Figure 1:
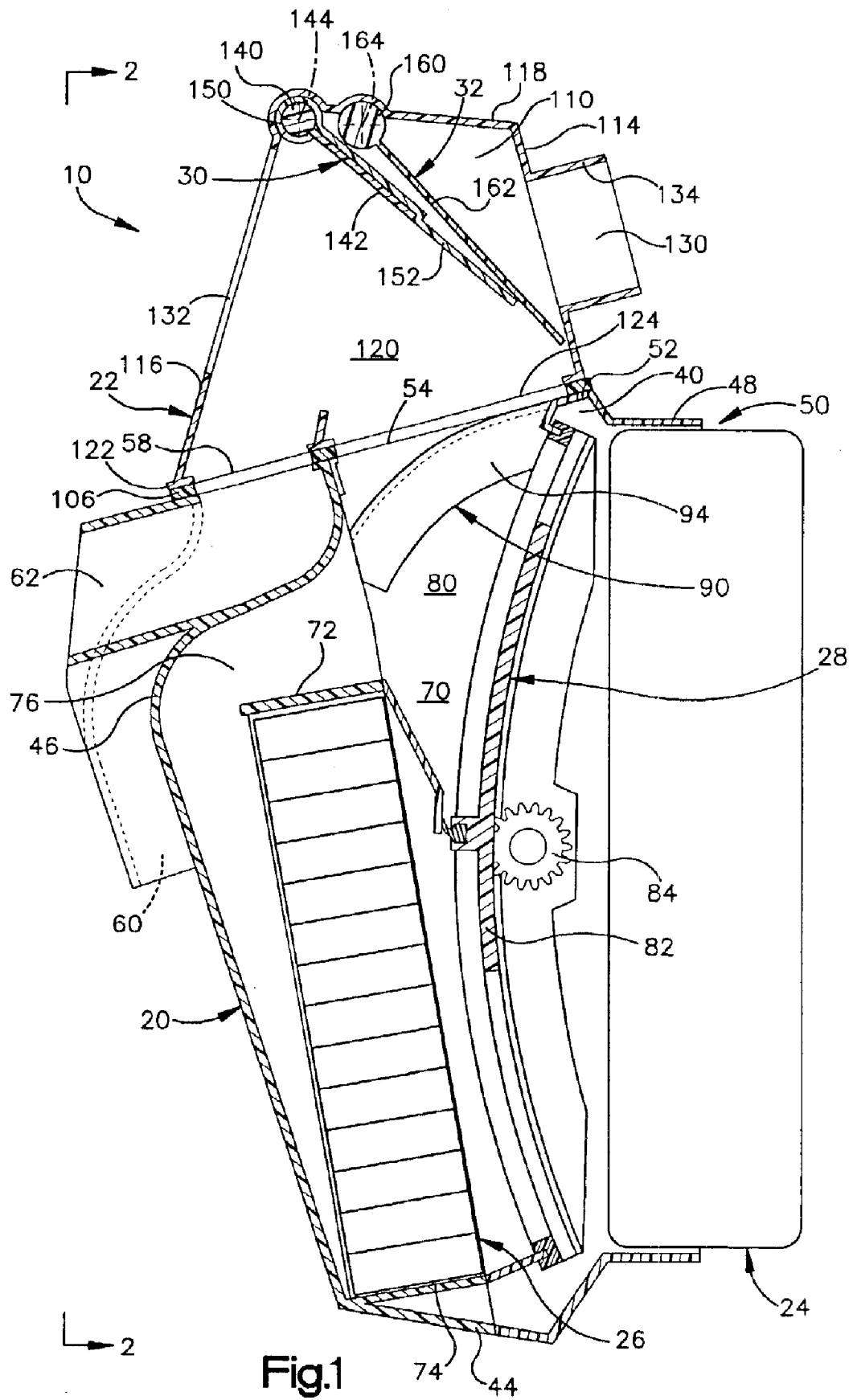
FIG. 1 is a sectional view of an apparatus for mixing air in a vehicle HVAC system.

The present invention is directed to an apparatus for mixing air in an HVAC system in a vehicle. As representative of the present invention, FIG. 1 illustrates an apparatus 10 that comprises a portion of an HVAC system for providing air at a controllable temperature into a passenger compartment (not shown) of a vehicle. The apparatus 10 is designed to be located in a vehicle instrument panel (not shown). The apparatus 10 includes first and second housings 20 and 22, an evaporator core 24, a heating core 26, a sliding door assembly 28, and first and second rotating door assemblies 30 and 32.

Figure 2:
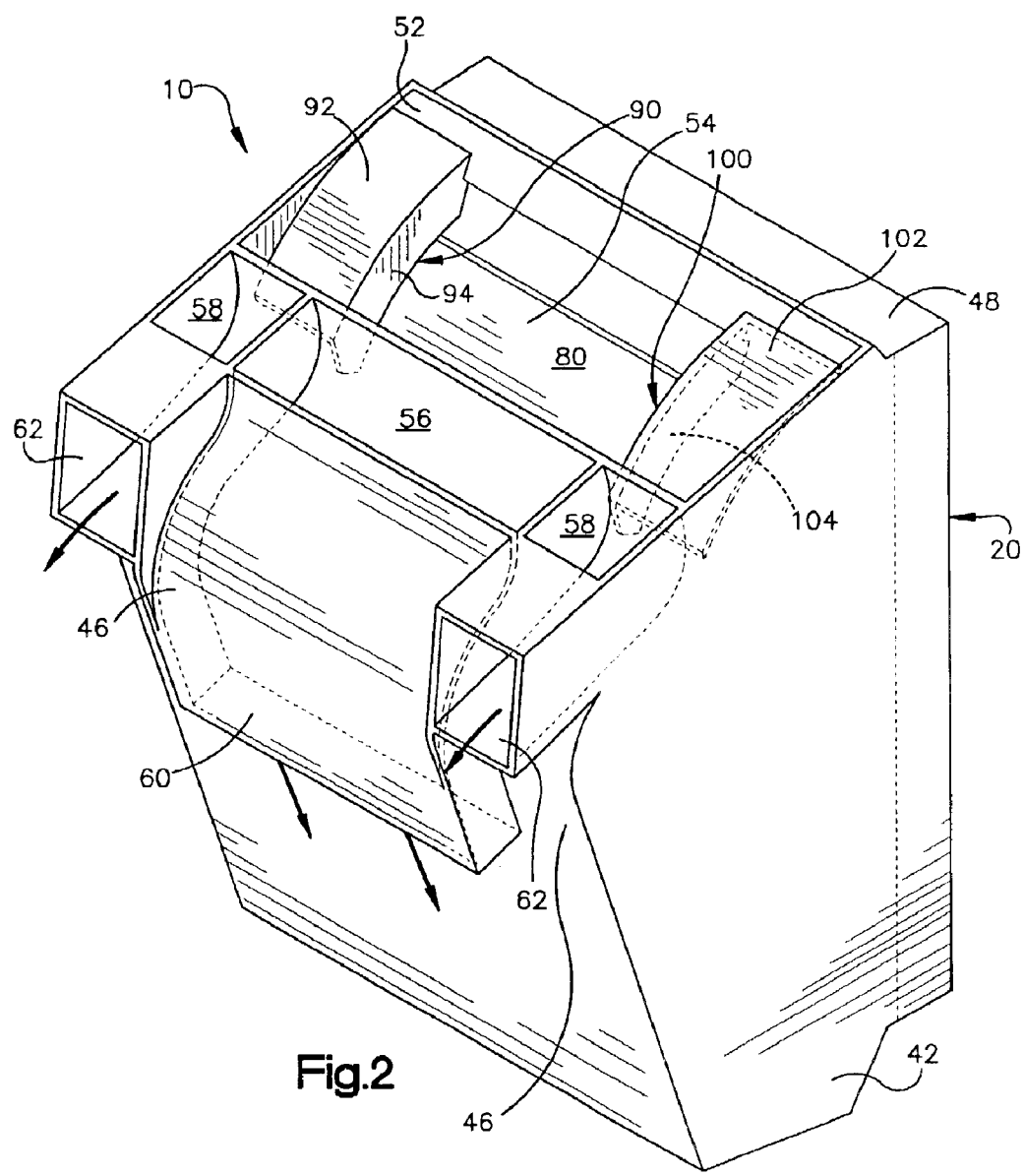
FIG. 2 is a perspective view of the apparatus of FIG. 1 with parts omitted for clarity.

The first housing 20 is made of a polymeric material and has a box-like shape. The first housing 20 may be made of a single part or by joining, using any known and suitable means, multiple parts. The first housing 20 is defined by oppositely disposed first and second side walls 40 and 42 (FIG. 3), a lower (as viewed in FIG. 1) wall 44, and a curved back wall 46. Opposite the back wall 46, the first housing 20 includes a generally square-shaped frame defining a large window 50. The evaporator core 24 is disposed in the window 50 and is secured to the frame 48 in a manner not shown. Opposite the lower wall 44, the first housing 20 includes an upper (as viewed in FIG. 1) wall 52 that defines an outlet 54 directing air from the first housing into the second housing 22. The upper wall 52 of the first housing 20 also partially defines a first outlet 56 (FIG. 2) and a pair of second outlets 58 disposed on opposite ends of the first outlet. The first outlet 56 directs air into a front seat floor duct 60 formed in the first housing 20. The second outlets 58 direct air into a corresponding pair of rear seat floor ducts 62 formed in the first housing 20.

The side walls 40 and 42, the lower wall 44, and the back wall 56 together define a chamber 70 (FIG. 1) inside the housing. Upper (as viewed in FIG. 1) and lower support members 72 and 74 are disposed in a lower portion of the chamber 70. The heater core 26 is secured in the chamber 70 by the support members 72 and 74 in a manner not shown. A heated air inlet duct 76 is formed in the chamber 70 between the curved back wall 46 and the upper support member 72. Heated air exiting the heater core 26 flows through the heated air inlet duct 76 and into a mixing portion 80 of the chamber 70 that is defined between the upper support member 72 and the outlet 54 to the second housing 22.

The sliding door assembly 28 is disposed in the chamber 70 adjacent the frame 48 and the evaporator core 24 mounted therein. The sliding door assembly 28, is described in detail in U.S. Pat. No. 6,224,480 B1, which is assigned to the assignee of the present invention. The sliding door assembly 28 includes an arcuate door 82 that is driven by gears 84. The sliding door assembly 28 is operated by an actuator (not shown) to vary (a) the amount of air that flows from the evaporator core 24 into the heater core 26, and (b) the amount of air that flows from the evaporator core directly into the mixing portion 80 of the chamber 70.

Figure 3:
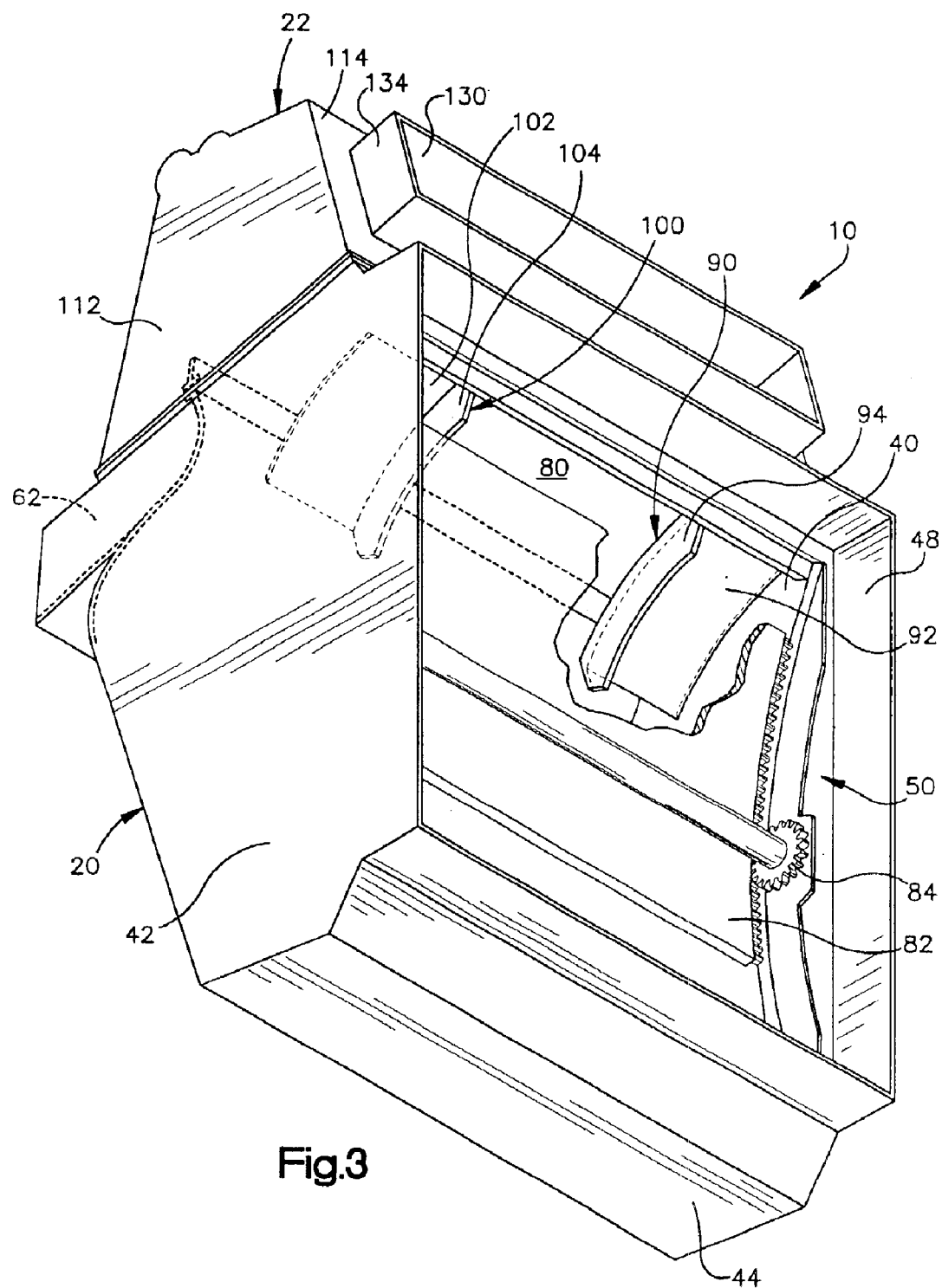
FIG. 3 is another perspective view of the apparatus of FIG. 1 with parts omitted for clarity.

As may be seen in FIG. 3, first and second airflow diverters 90 and 100 are located in the mixing portion 80 of the chamber 70. The first airflow diverter 90 projects into the mixing portion 80 of the chamber 70 from the first side wall 40 of the housing 20. The first airflow diverter 90 is attached to the first side wall 40 by a suitable fastening means, such as, for example, fasteners (not shown) or through ultrasonic welding. Alternatively, the first airflow diverter 90 can be formed (i.e., molded) together with the first housing 20 as a continuous, unitary part.

The first airflow diverter 90 includes a first wall 92 having an arcuate shape and that extends at a right angle from the first side wall 40. The first airflow diverter 90 further includes a planar second wall 94 that extends downward (as viewed in FIGS. 1–3) at a right angle from the first wall 92. It should, however, be understood by those skilled in the art that the first airflow diverter 90 could be configured differently. For example, the first wall 92 of the first airflow diverter 90 could be planar and extend in parallel with the upper wall 52 of the first housing 20. Further, the second wall 94 of the first airflow diverter 90 could have an arcuate shape. Additional alternatives for the first airflow diverter 90 include omitting the second wall 94 or adding additional walls, such as baffling walls underneath the first wall 92.

The second airflow diverter 100 projects into the mixing portion 80 of the chamber 70 from the second side wall 42 of the first housing 20. The second airflow diverter 100 is attached to the second side wall 42 by a suitable fastening means, such as, for example, fasteners (not shown) or through ultrasonic welding. Alternatively, the second airflow diverter 100 can be formed (i.e., molded) together with the first housing 20 as a continuous, unitary part.

The second airflow diverter 100 is a mirror image of the first airflow diverter 90. It should, however, be understood by those skilled in the art that the second airflow diverter 100 does not have to be a mirror image of the first airflow diverter 90. The second airflow diverter 100 includes a first wall 102 having an arcuate shape and that extends at a right angle from the second side wall 42. The second airflow diverter 100 further includes a planar second wall 104 that extends downward (as viewed in FIGS. 1–3) at a right angle from the first wall 102. As with the first airflow diverter 90, it should be understood by those skilled in the art that the second airflow diverter 100 could be configured differently. For example, the first wall 102 of the second airflow diverter 100 could be planar and extend in parallel with the upper wall 52 of the first housing 20. Further, the second wall 104 of the second airflow diverter 100 could have an arcuate shape. Additional alternatives for the second airflow diverter 100 include omitting the second wall 104 or adding additional walls, such as baffling walls underneath the first wall 102.

The second housing 22 of the apparatus 10 is mounted to the upper wall 52 of the first housing 20. A seal 106 (FIG. 1) is positioned between the first and second housings 20 and 22. The second housing 22 has a box-like configuration and is made of a polymeric material. The second housing 22 has oppositely disposed first and second side walls 110 and 112 (FIG. 3), a front wall 114, a back wall 116, and an upper (as viewed in FIG. 1) wall 118. The side walls 110 and 112, the front wall 114, the back wall 116, and the upper wall 118 together define a plenum chamber 120 inside the second housing 22. The plenum chamber 120 is in fluid communication with, and functions as an extension of, the mixing portion 80 of the chamber 70 in the first housing 20.

Opposite the upper wall 118, the second housing 22 includes a lower wall 122 that mirrors the upper wall 52 of the first housing 20. The lower wall 122 in the second housing 22 includes an inlet 124 directing air from the outlet 54 of the chamber 70 in the first housing 20 into the plenum chamber 120 in the second housing. The lower wall 122 of the second housing 22 also partially defines the first outlet 56, which directs air into the front seat floor duct 60, and the second outlets 58, which direct air into the rear seat floor ducts 62.

The second housing 22 further includes a defroster outlet 130 and an instrument panel outlet 132. The defroster outlet 130 is formed in the front wall 114 by a frame 134. The defroster outlet 130 directs air from the plenum chamber 120 into a defroster duct (not shown). The instrument panel outlet 132 is formed in the back wall 116 of the second housing 22 and directs air from the plenum chamber 120 into the passenger compartment of the vehicle through ducts (not shown).

Figure 4:
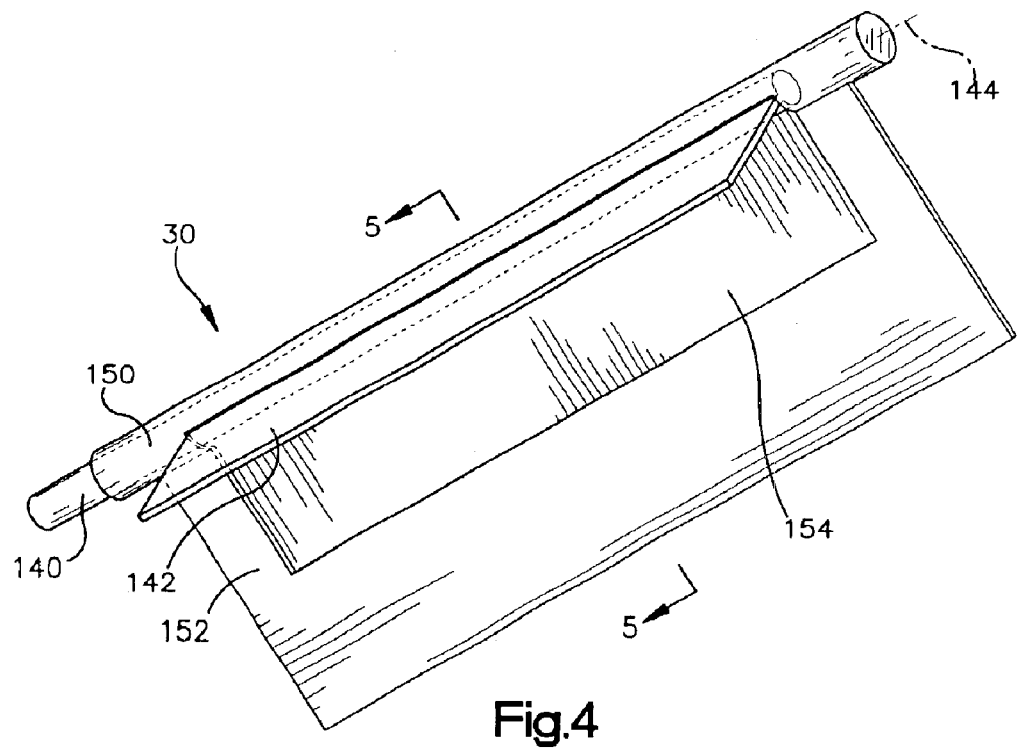
FIG. 4 is a perspective view of a component of the apparatus of FIG. 1.
Figures 5, 5A:
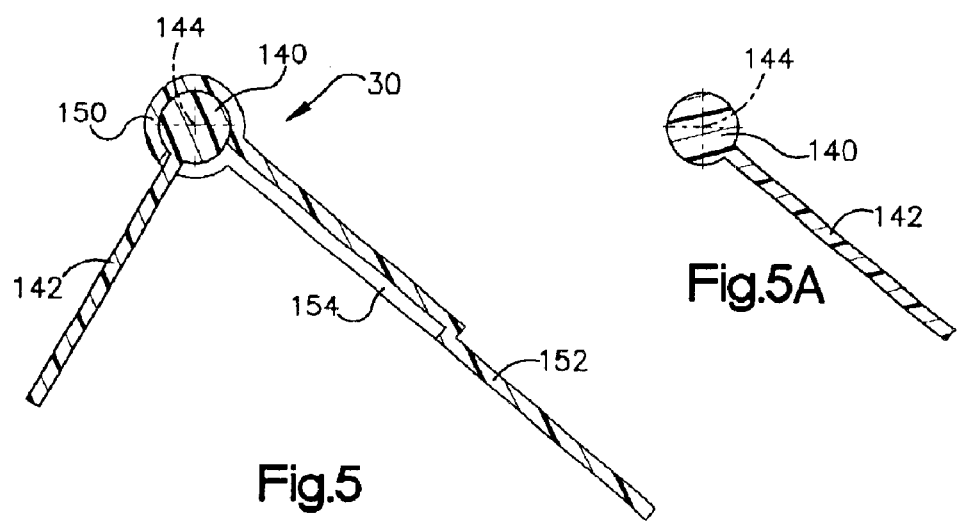
FIG. 5 is a sectional view taken along line 5—5 in FIG. 4.
FIG. 5A is view similar to FIG. 5 illustrating an earlier stage of manufacture.

The first and second rotating door assemblies 30 and 32 are rotatably supported along the upper wall 118 of the second housing 22. The first rotating door assembly 30 includes a rotatable first shaft 140 (FIG. 4) and a first door 142. The first shaft 140 is made of a first polymeric material M1 having a first melting point. The first shaft 140 is supported by the first and second side walls 110 and 112 of the second housing 22 and is rotatable about an axis 144.

The first door 142 projects radially outward from the first shaft 140. The first door 142 is made of the first polymeric material M1 and is molded together with the first shaft as a continuous, unitary part so that the first door rotates along with the first shaft 140 about the axis 144. The first door 142 has a generally rectangular shape with a first surface area A1.

The first rotating door assembly 30 further includes a rotatable sleeve 150 and a second door 152. The sleeve 150 is made of a second polymeric material M2 that has a second melting point that is lower than the first melting point of the first polymeric material M1 to enable the sleeve to be molded over the first shaft 142 (after the first shaft has cooled down) using a known overmolding process. The sleeve 150 is disposed coaxially about the first shaft 142 and is rotatable about the axis 144 relative to the first shaft.

The second door 152 projects radially outward from the sleeve 150. The second door 152 is made of the second polymeric material M2 and is molded together with the sleeve 150 as a continuous, unitary component so that the second door rotates about the axis 144 along with the sleeve relative to the first door 142. Further, the second door 152 is molded over the first door 142 during the same process used to mold the sleeve 150 over the first shaft 140. The second door 152 has a generally rectangular shape and a second surface area A2 that is larger than the surface area A1 of the first door 142. The second door 152 includes a rectangular recess 154 that is dimensioned to receive the first door 142 and allow the first and second doors to share the same axis 144 of rotation.

It is important that the first and second polymeric materials M1 and M2 be selected so that they are incompatible with each other. By being incompatible with each other, it is meant that the coefficient of friction between the first shaft 140 and the sleeve 150 is such that the second polymeric material M2 does not form a chemical or mechanical bond with (i.e., does not stick to), the first polymeric material M1 either during, or after, the sleeve is molded over the first shaft. Thus, the first shaft 140 is able to rotate freely within the sleeve 150.

The first polymeric material M1 may be a thermoplastic material or a thermoset material. For example, the first polymeric material M1 may be a liquid crystal polymer such as Vectra® brand plastic, which is liquid crystal aromatic polyester. Another suitable first polymeric material M1 is Xenoy® brand plastic, which is a blend of polycarbonate and polyester. The second polymeric material M2 may be a thermoplastic material or a thermoset material. For example, the second polymeric material M2 may be Delrin® brand plastic, which is a polyacetal, or Nylon® plastic brand plastic, which is a polyamide. Once the two polymeric materials M1 and M2 have been determined to be incompatible with each other, it generally does not matter which of the two polymeric materials is chosen to form the first shaft 140 and which is chosen to form the sleeve 150, as long as the melting point of the material chosen to form the sleeve is lower than the melting point of the material chosen to form the first shaft.

Table 1, below, is a matrix illustrating the incompatibility of some common polymeric materials. It should be understood that Table 1 is not an exhaustive list of all the incompatible combinations of polymeric materials, but is only offered as an example of some incompatible polymeric material combinations which might be useful in practicing the present invention. A diamond (♦) in a box indicates that the polymeric material in the vertical column containing the box is incompatible with the polymeric material in the horizontal row containing the box. For instance, polyacrylobutadiene styrene (ABS) and polypropylene (PP) are incompatible. It should be noted that the first and/or second polymeric materials could have friction reducing additives, such as Teflon powder, molybdenum disulfide ($M_oS_2$), waxes or any other additive known to those skilled in the art.

TABLE 1

|  | ABS | ASA | CA | EVA | PA 6 | PA 66 | PC | PE-HD | PE-LD | PMMA | POM | PP | PPO mod | PS-GP | PS-HI | PBTP | TPU | PVC | SAN | Blend PC + PBTB | Blend PC + ABS |
|---|---|---|---|---|---|---|---|---|---|---|---|---|---|---|---|---|---|---|---|---|---|
| ABS | ◆ | ◆ | ◆ |  |  |  |  | ◆ |  |  |  | ◆ | ◆ | ◆ | ◆ |  |  |  |  |  |  |
| ASA | ◆ | ◆ | ◆ |  |  |  |  | ◆ |  |  |  | ◆ | ◆ | ◆ | ◆ |  |  |  |  |  |  |
| CA | ◆ | ◆ | ◆ |  |  |  |  |  |  |  |  |  |  |  |  |  |  |  |  |  |  |
| EVA |  |  |  |  |  |  |  |  |  |  |  |  |  |  |  |  |  |  |  |  |  |
| PA 6 |  |  |  |  |  |  |  |  |  |  |  |  |  |  |  |  |  |  |  |  |  |
| PA 66 |  |  |  |  |  |  |  |  |  |  |  |  |  |  |  |  |  |  |  |  |  |
| PC |  |  |  |  |  |  | ◆ |  |  |  |  |  |  |  |  |  |  |  |  |  |  |
| PE-HD |  |  |  |  |  |  |  | ◆ | ◆ |  |  | ◆ | ◆ | ◆ | ◆ |  |  |  |  |  |  |
| PE-LD |  |  |  |  |  |  |  | ◆ | ◆ |  |  | ◆ | ◆ | ◆ | ◆ |  |  |  |  |  |  |
| PMMA |  |  |  |  |  |  |  |  |  | ◆ |  |  |  | ◆ | ◆ |  |  |  |  |  |  |
| POM |  |  |  |  |  |  |  |  |  |  | ◆ |  |  |  |  |  |  |  |  |  |  |
| PP |  |  |  |  |  |  |  |  |  |  |  | ◆ |  |  |  |  |  |  |  |  |  |
| PPO mod. | ◆ | ◆ |  |  |  |  |  |  |  |  |  |  | ◆ | ◆ | ◆ |  |  |  |  |  |  |
| PS-GP | ◆ | ◆ |  |  |  |  |  |  |  |  |  |  | ◆ | ◆ | ◆ |  |  |  |  |  |  |
| PS-HI | ◆ | ◆ |  |  |  |  |  |  |  |  |  |  | ◆ | ◆ | ◆ |  |  |  |  |  |  |
| PBTP |  |  |  |  |  |  |  |  |  |  |  |  |  |  |  | ◆ | ◆ |  | ◆ | ◆ | ◆ |
| TPU |  |  |  | ◆ | ◆ | ◆ |  |  |  |  |  |  |  |  |  | ◆ | ◆ | ◆ | ◆ | ◆ | ◆ |
| PVC |  |  |  |  |  |  |  |  |  |  |  |  |  |  |  |  | ◆ | ◆ |  |  |  |
| SAN | ◆ | ◆ | ◆ |  |  |  |  | ◆ | ◆ |  |  | ◆ | ◆ | ◆ | ◆ | ◆ | ◆ |  | ◆ | ◆ | ◆ |
| Blend PC + PBT |  |  |  |  |  |  | ◆ |  |  |  |  |  |  |  |  | ◆ | ◆ |  | ◆ | ◆ | ◆ |
| Blend PC + ABS | ◆ | ◆ |  |  |  |  | ◆ |  |  |  |  |  |  | ◆ | ◆ | ◆ | ◆ |  | ◆ | ◆ | ◆ |

◆ no adhesion

ABS—polyacrylobutadiene styrene
ASA—acrylonitrile-styrene-acrylate
CA—cellulose acetate
EVA—ethylene-vinylacetate
PA 6—polyamide 6 (nylon 6)
PA 66—polyamide 66 (nylon 66)
PC—polycarbonate
PE-HD—polyethylene (High Density)
PE-LD—polyethylene (Low Density)
PMMA—poly(methyl) methacrylate
POM—polyoxymethylene
PP—polypropylene
PPO mod.—poly(phenylene oxide) (Modified)
PS-GP—polystyrene (General Purpose)
PS-HI—polystyrene (High Impact)
PBTP—polybutylene terapthalate
TPU—thermoplastic polyurethane
PVC—polyvinylchloride
SAN—polyacrylostyrene The second door assembly 32 comprises a second shaft 160 and a third door 162. The second shaft 160 is supported by the first and second side walls 110 and 112 of the second housing 22 and is rotatable about a second axis 164. The third door 162 projects radially outward from the second shaft 160. The second shaft 160 and the third door 162 are made of a polymeric material and are molded together as a continuous, unitary part so that the third door rotates along with the second shaft about the second axis 164.

Rotation of the first and second door assemblies 30 and 32 is controlled by an actuator (not shown). U.S. Pat. No. 6,209,404, which is assigned to the assignee of the present invention, describes a suitable actuator for controlling both the first and second door assemblies 30 and 32. It should, however, be understood that another actuator or multiple actuators could be used to control the first and second door assemblies 30 and 32.

Figure 6:
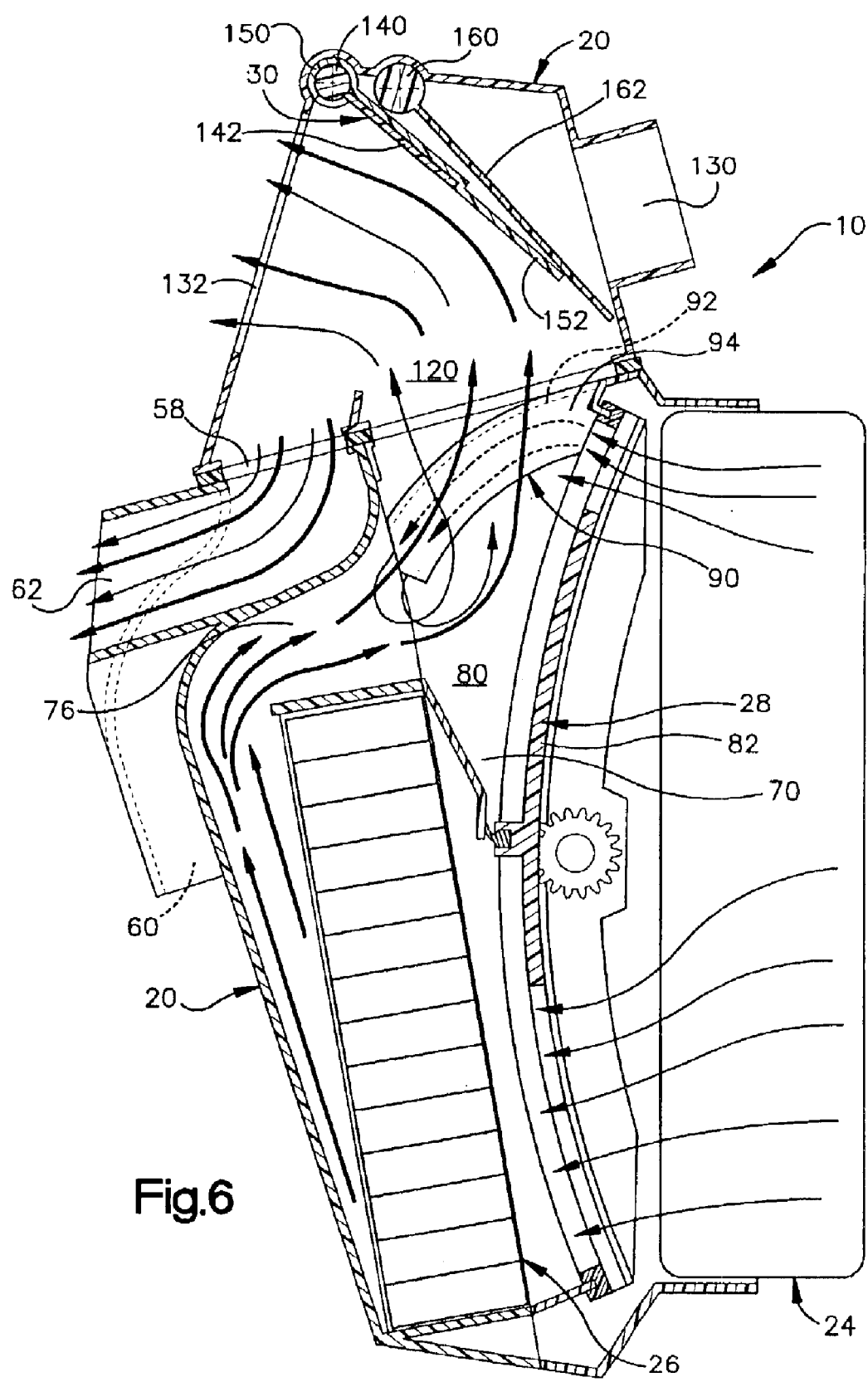
FIG. 6 is a view similar to FIG. 1 illustrating the flow of hot air and cold air through the apparatus.

FIG. 6 illustrates how the apparatus 10 according to the present invention functions to causing mixing of cold air with hot air in the mixing portion 80 of the chamber 70. In FIG. 6, the arcuate door 82 in the sliding door assembly 28 is in an intermediate position to provide air at an intermediate temperature to the outlets 56, 58, 130 and 132 into the passenger compartment. With the arcuate door 82 in the intermediate position, all of the air passes through the evaporator core 24 and is cooled. A portion of the cold air (indicated by the thin-line arrows in FIG. 6) from the evaporator core 24 is directed under the arcuate door 82 and into the heater core 26 for heating. The heated air (indicated by the thick-line arrows in FIG. 6) then passes through the heated air inlet duct 76 and into the mixing portion 80 of the chamber 70 in the first housing 20. Another portion of the cold air from the evaporator core 24 passes over the top of the arcuate door 82 and directly into the mixing portion 80 of the chamber 70.

The hot air that enters the mixing portion 80 of the chamber 70 through the heated air inlet duct 76 is moving at a relatively low velocity due to its tortuous path through the heater core 26 and the heated air inlet duct. In contrast, the cold air that enters the mixing portion 80 of the chamber 70 directly from the evaporator core 24 is moving at a relatively high velocity. This disparity in velocity can lead to undesirable temperature stratification in the HVAC system as the faster moving cold air can move past the slower hot air and exit through the instrument panel outlet 132, forcing the hot air to exit through the first and second outlets 56 and 58. However, in accordance with a feature of the present invention, the airflow diverters 90 and 100 in the mixing portion 80 of the chamber 70 function to minimize any such temperature stratification in the HVAC system.

To minimize temperature stratification, the airflow diverters 90 and 100 in the mixing portion 80 of the chamber 70 redirect portions of the cold air that pass over the top of the arcuate door 82 adjacent the side walls 40 and 42 of the first housing 20 where the airflow diverters are located. The cold air that passes over the arcuate door 82 adjacent the first side wall 40 comes into contact with the first and second walls 92 and 94 of the first airflow diverter 90, causing the air to be redirected downward, as shown by the arrows in FIG. 6, into the flow of hot air in the mixing chamber 80 of the chamber 70. Likewise, the cold air that passes over the arcuate door 82 adjacent the second side wall 42 comes into contact with the first and second walls of the second airflow diverter 100, causing the air to be redirected downward, as shown by the arrows in FIG. 6, into the flow of hot air in the mixing chamber 80 of the chamber 70.

The cold air that is redirected downward by the airflow diverters 90 and 100 then mixes with the hot air in the mixing portion 80 of the chamber 70. Further, the redirected cold air, along with the cold air that flows directly into the center of the mixing portion 80 of the chamber 70, pushes the hot air upward into the plenum chamber 120 in the second housing 22. The mixing of hot and cold air that takes place in the mixing portion 80 of the chamber 70 ensures that the air flowing into the plenum chamber 120 and out of the instrument panel outlet 132 and the floor outlets 56 and 58 has a fairly uniform temperature. It should be noted that the airflow diverters 90 and 100 do not extend across the entire width of the first housing 20 in order to maintain a sufficient quantity of overall airflow, as the airflow diverters do decrease the velocity of the cold air that comes into contact with them.

Inside the second housing 22, the first and second door assemblies 30 and 32 are rotatable between a number of different positions to direct the air from the mixing portion 80 of the chamber 70 out into selected areas of the vehicle. In the positions shown in FIG. 6, the air from the mixing portion 80 of the chamber 70 flows into the plenum chamber 120 and is directed out through the instrument panel outlet 132 as well as the floor outlets 56 and 58. FIG. 7 shows the first door 142 of the first door assembly 30 covering a portion of the instrument panel outlet 132 to decrease the amount of air flowing out through the instrument panel outlet and increase the amount of air flowing out through the floor outlets 56 and 58.

FIG. 8 illustrates a different position for the first door assembly 30 in which the second door 152 completely covers the instrument panel outlet 132, thereby directing all of the air to exit through the floor outlets 56 and 58. FIG. 9 is similar to FIG. 8, but shows the second door assembly 32 rotated to a position which allows a portion of the air from the mixing portion 80 of the chamber 70 to flow out of the plenum chamber 120 through the defroster outlet 130. Another variation is illustrated in FIG. 10, where the second door assembly 32 is rotated to a position that directs all of the air from the mixing portion 80 of the chamber 70 to flow out of the plenum chamber 120 through the defroster outlet 130.

From the above description of the invention, those skilled in the art will perceive improvements, changes and modifications. Such improvements, changes and modifications within the skill of the art are intended to be covered by the appended claims.

Having described the invention, I claim:

1. An apparatus for a heating, ventilation, and air conditioning system that provides air at a controllable temperature into a passenger compartment of a vehicle, said apparatus comprising:

a housing defining a chamber, said chamber having a first inlet through which cold air enters said chamber and a second inlet through which warm air enters said chamber;

said housing further including at least one outlet in fluid communication with said chamber and for directing air into the passenger compartment in the vehicle; and at least one airflow diverter disposed in said chamber, said at least one air flow diverter having at least one wall that redirects a portion of the cold air entering said chamber through said first inlet to cause a portion of the cold air to mix in said chamber with the warm air entering said chamber through said second inlet.

2. The apparatus of claim 1 wherein said means for mixing extends from said housing in said chamber.

3. The apparatus of claim 1 wherein said means for mixing is formed together with said housing as a continuous, unitary part.

4. The apparatus of claim 1 wherein said at least one airflow diverter comprises a pair of airflow diverters disposed on opposite lateral sides of said chamber.

5. The apparatus of claim 1 wherein said at least one wall has an arcuate shape.

6. The apparatus of claim 1 wherein said at least one airflow diverter has a plurality of walls that redirect the flow of a portion of the cold air entering said chamber through said first inlet to cause the portion of the cold air to mix in said chamber with the warm air entering said chamber through said second inlet.

7. The apparatus of claim 6 wherein at least two of said plurality of walls in said at least one airflow diverter extend at right angles to each other.

8. An apparatus for a heating, ventilation, and air conditioning system that provides air at a controllable temperature into a passenger compartment of a vehicle, said apparatus comprising:

a housing defining a chamber, said chamber having a first inlet through which cold air enters said chamber and a second inlet through which warm air enters said chamber;

said housing further including at least one outlet in fluid communication with said chamber and for directing air into the passenger compartment in the vehicle; and a pair of airflow diverters disposed on opposite lateral sides of said chamber for causing a portion of the cold air flowing through said first inlet to mix in said chamber with the warm air flowing through said second inlet.

9. The apparatus of claim 8 wherein said at least one airflow diverter extends from said housing in said chamber.

10. The apparatus of claim 9 wherein said at least one airflow diverter is formed together with said housing as a continuous, unitary part.

11. The apparatus of claim 8 wherein said at least one airflow diverter has at least one wall that redirects the flow of a portion of the cold air entering said chamber through said first inlet to cause the portion of the cold air to mix in said chamber with the warm air entering said chamber through said second inlet.

12. The apparatus of claim 8 wherein said at least one airflow diverter has a plurality of walls that redirect the flow of a portion of the cold air entering said chamber through said first inlet to cause the portion of the cold air to mix in said chamber with the warm air entering said chamber through said second inlet.

13. The apparatus of claim 12 wherein at least one of said plurality of walls has an arcuate shape.

14. An apparatus for a heating, ventilation, and air conditioning system that provides air at a controllable temperature into a passenger compartment of a vehicle, said apparatus comprising:

a housing defining a chamber, said chamber having a first inlet through which cold air enters said chamber and a second inlet through which warm air enters said chamber;

said housing further including at least one outlet in fluid communication with said chamber and for directing air into the passenger compartment in the vehicle; and at least one airflow diverter for redirecting the flow of a portion of the cold air entering said chamber through said first inlet to cause the portion of cold air to mix in said chamber with the warm air entering said chamber through said second inlet, said at least one airflow diverter extending from said housing in said chamber.

15. The apparatus of claim 14 wherein said at least one airflow diverter is formed together with said housing as a continuous, unitary part.

16. The apparatus of claim 14 wherein said at least one airflow diverter comprises a pair of airflow diverters disposed on opposite lateral sides of said chamber.

17. The apparatus of claim 14 wherein said at least one airflow diverter has at least one wall that redirects the flow of the portion of the cold air entering said chamber through said first inlet.

18. The apparatus of claim 17 wherein said at least one wall has an arcuate shape.

19. The apparatus of claim 14 wherein said at least one airflow diverter has a plurality of walls that redirect the flow of the portion of the cold air entering said chamber through said first inlet.

20. A heating, ventilation, and air conditioning (HVAC) apparatus for delivering air at a controlled temperature into the passenger compartment of a vehicle, said HVAC apparatus comprising:

a housing having a chamber, said housing defining first and second inlets for directing airflow into said chamber and at least one outlet for directing airflow from said chamber into the passenger compartment;

an evaporator core for producing a flow of cold air through said first inlet;

a heater core for producing a flow of warm air through said second inlet; and at least one airflow diverter disposed in said chamber, said at least one airflow diverter for causing a portion of the flow of cold air through said first inlet to mix in said chamber with the warm air flowing through said second inlet, said portion of the flow of cold air being less than all of the flow of cold air through said first inlet.

21. The apparatus of claim 20 wherein said at least one airflow diverter extends from said housing in said chamber.

22. The apparatus of claim 20 wherein said at least one airflow diverter is formed together with said housing as a continuous, unitary part.

23. The apparatus of claim 20 wherein said at least one airflow diverter comprises a pair of airflow diverters disposed on opposite lateral sides of said chamber.

24. The apparatus of claim 20 wherein said at least one airflow diverter has at least one wall that redirects the flow of a portion of the cold air entering said chamber through said first inlet to cause the portion of the cold air to mix in said chamber with the warm air entering said chamber through said second inlet.

25. The apparatus of claim 24 wherein said at least one wall has an arcuate shape.

26. The apparatus of claim 20 wherein said at least one airflow diverter has a plurality of walls that redirect the flow of a portion of the cold air entering said chamber through said first inlet to cause the portion of the cold air to mix in said chamber with the warm air entering said chamber through said second inlet.

27. An apparatus for a heating, ventilation, and air conditioning system that provides air at a controllable temperature into a passenger compartment of a vehicle, said apparatus comprising:

a housing defining a chamber, said chamber having a first inlet through which cold air flows into said chamber and a second inlet through which warm air flows into said chamber;

said housing further including at least one outlet in fluid communication with said chamber and for directing air into the passenger compartment in the vehicle; and at least one airflow diverter in said chamber, said at least one air flow diverter reducing the velocity of a portion of the cold air flowing into said chamber through said first inlet, said portion of the cold air flowing through said first inlet being less than all of the cold air flowing through said first inlet, said portion of cold air mixing in said chamber with the warm air entering said chamber through said second inlet.

* * * * *

UNITED STATES PATENT AND TRADEMARK OFFICE
CERTIFICATE OF CORRECTION

PATENT NO. : 6,881,140 B2
DATED : April 19, 2005
INVENTOR(S) : Vu Le

It is certified that error appears in the above-identified patent and that said Letters Patent is hereby corrected as shown below:

Column 12,
Line 14, after "portion" insert -- that is less than all --.

Signed and Sealed this

Third Day of January, 2006

JON W. DUDAS
*Director of the United States Patent and Trademark Office*